United States Patent [19]

Knoedler et al.

[11] 4,456,302

[45] Jun. 26, 1984

[54] JUVENILE SEAT WITH ADJUSTABLE AUTOMATIC LOCKING BARRIER

[75] Inventors: Roy E. Knoedler; Otis J. Basey, both of Columbus, Ind.

[73] Assignee: Cosco, Inc., Columbus, Ind.

[21] Appl. No.: 201,549

[22] Filed: Oct. 28, 1980

[51] Int. Cl.³ .................................. A47C 31/00
[52] U.S. Cl. ........................... 297/488; 297/150; 297/216; 297/250; 297/464
[58] Field of Search ............... 297/487, 488, 216, 377, 297/250, 254, 255, 149, 150, 151, 256, 464; 280/748

[56] References Cited

U.S. PATENT DOCUMENTS

| | | | |
|---|---|---|---|
| 2,532,812 | 12/1950 | Huber | 297/149 |
| 3,345,105 | 10/1967 | Levy et al. | 297/149 X |
| 3,369,839 | 2/1968 | Telarico | 297/154 X |
| 3,563,600 | 2/1971 | Converse | 297/254 |
| 3,572,827 | 3/1971 | Herelis | 297/256 X |
| 3,640,572 | 2/1972 | Doehler | 297/488 |
| 4,231,612 | 11/1980 | Meeker | 297/250 |
| 4,288,123 | 9/1981 | Cone | 297/154 |
| 4,295,683 | 10/1981 | Dubbink et al. | 297/377 |

FOREIGN PATENT DOCUMENTS

3850 9/1979 European Pat. Off. ............ 297/216

*Primary Examiner*—James T. McCall
*Attorney, Agent, or Firm*—Barnes & Thornburg

[57] ABSTRACT

A seat for securing a juvenile in a vehicle includes a seat for a juvenile occupant, a barrier positionable in front of the seat to limit forward movement of the occupant, a pivotal coupling between the barrier and the seat to permit hinged movement of the barrier relative to the seat, and a self-locking latch mechanism. The self-locking latch mechanism, when engaged, prohibits movement of the barrier in a first direction relative to the seat portion to limit forward movement of the occupant and permits movement of the barrier in a second direction relative to the seat to permit adjustment of the position of the barrier relative to the occupant placed in the seat. The latch mechanism is positioned intermediate the pivotal coupling and the barrier and can include an adjustable detent for variably positioning the barrier in one of a plurality of spaced relationships relative to the seat to accommodate occupants of various sizes.

19 Claims, 9 Drawing Figures

JUVENILE SEAT WITH ADJUSTABLE AUTOMATIC LOCKING BARRIER

The present invention relates to juvenile car seats which include a movable barrier positionable in front of the seat portion to limit forward movement of an occupant of the seat. More particularly, the present invention concerns improvements related to the barrier and means for variably positioning the barrier in one of a plurality of spaced relationships in front of the seat and for automatically locking the barrier in the spaced relationship to limit forward movement of occupants of various sizes without the need for straps.

Many juvenile car seats have been developed which include a movable barrier positionable in spaced relationship in front of the seat portion to limit forward movement of the occupant of the seat when the car or other vehicle is suddenly stopped. More recently, new safety standards have been adopted that render many of the prior juvenile car seats unacceptable.

In the past, barriers have been pivotally or hingedly coupled to a frame structure which supports the seat portion occupied by a juvenile. In such prior barrier-type juvenile car seats known to applicants, the spaced relationship between the barrier and the seat when the barrier is positioned in front of the seat has been fixed. In addition, various straps or belts have been provided with the seat to accommodate occupants of various sizes, and a strap has been provided to engage the barrier to prevent it from being swung out of its position in front of the seat portion during use. Accordingly, where the juvenile occupying the seat portion is relatively small, the barrier has served as a secondary shield and the occupant is primarily held within the seat by various straps or belts.

In using the prior barrier-type juvenile car seats, it is necessary to first place the occupant in the seat, swing the barrier into position in front of the seat, and adjust various combinations of shoulder and crotch straps or belts to the size of the occupant to secure the occupant in the seat.

In other barrier-type juvenile car seats the barrier is fixed in a spaced relationship in front of the seat portion and the car or vehicle safety belt is positioned over or around the barrier to maintain the seat and the barrier in position.

In each of these prior juvenile car seats, numerous steps are required in order to secure the juvenile occupant in the seat so that forward movement of the occupant is limited if the vehicle is suddenly stopped.

It is therefore one object of the present invention to provide an improved barrier-type juvenile car seat where the position of the barrier in relationship to the front of the seat portion of the seat is variable, and where the barrier is automatically locked in a selected position relative to the front of the seat portion to prohibit movement of the barrier in one direction relative to the seat portion, and thereby restrict forward movement of a juvenile occupant.

It is another object of the present invention to provide an improved barrier-type juvenile car seat which does not require the use of shoulder and crotch straps or belts to secure the occupant in the seat in a forward facing direction. According to the present invention, no adjustment of belts and straps is needed in order to accommodate occupants of various sizes.

Still another object of the present invention is to provide an improved barrier-type juvenile car seat having a barrier which is positionable in various spaced relationships in front of the seat portion to correspond to the size of the occupant and which has a storage position at the rear of the seat portion so that the seat may be used without the barrier in a rear facing direction. The barrier is uniquely designed to provide a working surface and a contoured surface in proximity to the occupant.

Still a further object of the present invention is to provide an improved barrier-type juvenile car seat that requires less time to place and secure the occupant in the seat in comparison to conventional barrier-type juvenile seats. A still further object of the invention is to provide a barrier that may be conveniently swung into and automatically locked in its operative position.

According to one illustrative and preferred embodiment of the present invention, the juvenile car seat includes a contoured seat for a juvenile occupant, a barrier positionable in front of the seat for limiting forward movement of the occupant, means for pivotally coupling the barrier to the seat to permit hinged movement of the barrier relative to the seat, and a self-locking latch means for prohibiting movement of the barrier in a first direction relative to the seat to limit forward movement of the occupant and for permitting movement of the barrier in a second direction relative to the seat to adjust the position of the barrier relative to the occupant placed in the seat. The latch means is positioned intermediate the means for pivotally coupling the barrier to the seat and the barrier itself. The latch means can include an adjustable detent for variably positioning the barrier in one of a plurality of spaced relationships relative to the seat to accommodate occupants of various sizes.

The barrier can include a non-rotating cushion, presenting a child-protecting portion having a larger radius of curvature and a table-like working surface in its operative position.

Various other features and advantages of the present invention will become apparent in view of the following detailed description of one embodiment thereof, which description should be considered in conjunction with the accompanying drawings, in which.

Figure 1:
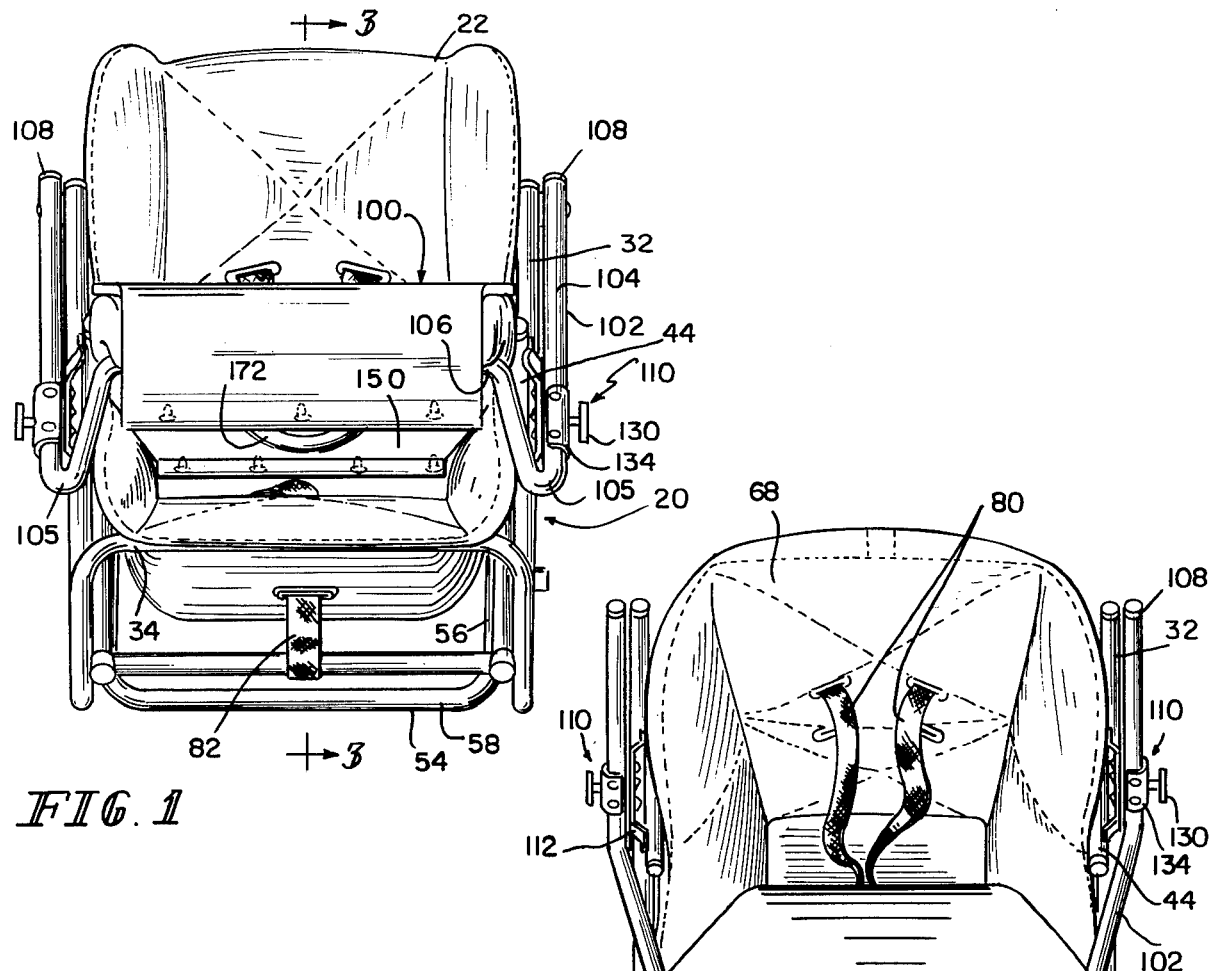
FIG. 1 is a front plan view of a juvenile car seat according to the present invention.

Referring now to FIGS. 1–6, the barrier-type juvenile car seat of the present invention can include a frame or supporting structure 20 for a contoured portion 22 which forms a seat for the placement of a juvenile occupant 24. In general, the frame 20 may be any conventional structure which includes a plurality of interconnected tubes forming a cradle for supporting the seat portion 22. In the illustrative embodiment, the frame 20 includes a side and front frame member 30 which includes two generally J-shaped side sections 32. The two side sections 32 are interconnected by a front section 34 which supports the front of the seat portion 22. The frame 20 further includes a large U-shaped side and rear frame member 36. The large side and rear frame member 36 includes two side sections 38 secured to the side sections 32 of the frame member 30 and a rear section 40 interconnecting the side sections 38 for supporting the back of the seat portion 22. The frame 20 also includes a small U-shaped side and rear frame member 42. The small side and rear frame member 42 includes two side sections 44 secured to the side sections 32 of the frame member 30 and a rear section 46 interconnecting the side sections 44 for also supporting the back of the seat portion 22. In the illustrative embodiment, each of the frame members 30, 36, 42 is constructed from a single elongated chrome tube. It should be noted that the side sections 32, 38, 44 of the frame members 30, 36, 42, respectively, are connected to form a generally triangular side structure for the frame 20 for strength and stability.

Although the illustrated preferred embodiments have a separate frame structure 20 exteriorly of the seat portion 22, it is to be understood that the seat portion can include or incorporate a supporting structure or frame and cooperate with the barrier and barrier securement means of this invention.

Figure 4:
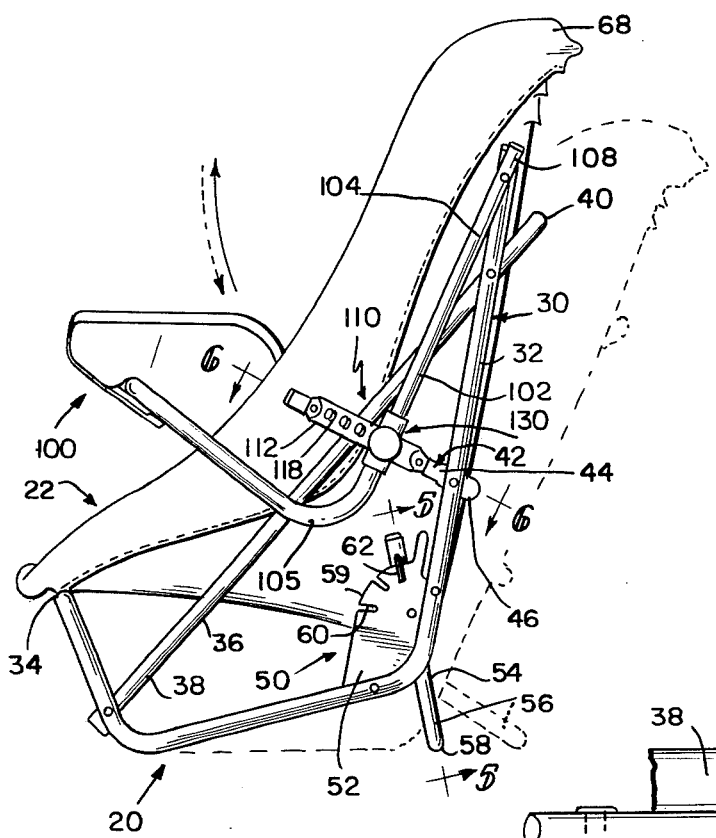
FIG. 4 is a side plan view of the seat shown in FIGS. 1 and 2 illustrating one adjustable feature of the seat.
Figure 5:
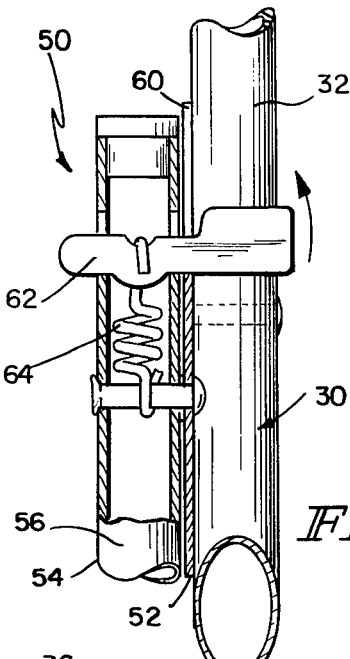
FIG. 5 is a transverse view, partly cross sectioned and broken away, of a section of the seat shown in FIGS. 1-4, taken generally along section lines 5—5 in FIG. 4.

As best shown in FIGS. 4 and 5, side sections 32 of the frame member 30 each includes means 50 for adjusting the angle of inclination or tilt of the seat. Various means are well known in the art for adjusting the angle of inclination of seats, and therefore it is not intended that the present invention be limited to any particular means. In the illustrative embodiment, the adjusting means 50 includes two adjustment plates 52 secured to each of the side sections 32 of the frame member 30 and a generally U-shaped movable tube 54 having side legs 56 which are pivotally coupled to the plates 52 and an intermediate section 58 therebetween for engaging a surface beneath the frame structure 20. Each of the plates 52 includes an arcuate edge 59. The edge 59 includes a plurality of detent slots 60 for receiving a detent pin 62 which is biased by a spring 64 into engagement with selected slots 60 to lock the tube 54 in a desired angular relationship to the frame members 30, 36, 42. The solid lines in FIG. 4 illustrate an extreme forward angle of inclination of the seat, and the broken lines illustrate an extreme rearward angle of inclination where the side sections 32 of the frame member 30 are resting squarely on the surface beneath the seat.

The contoured portion 22 which forms the seat for the juvenile occupant 24 is secured to the front section 34 of frame member 30 and to the rear section 40 of the frame member 36. In the illustrative embodiment, the seat portion 22 is molded as a unit from a polyethylene or other plastic-related material. Padding 66, shown in FIG. 3, may be added to the seat portion 22 for comfort of the occupant 24, and further, a cover 68, shown in FIG. 4, may be provided for aesthetically concealing the padding 66.

Figure 2:
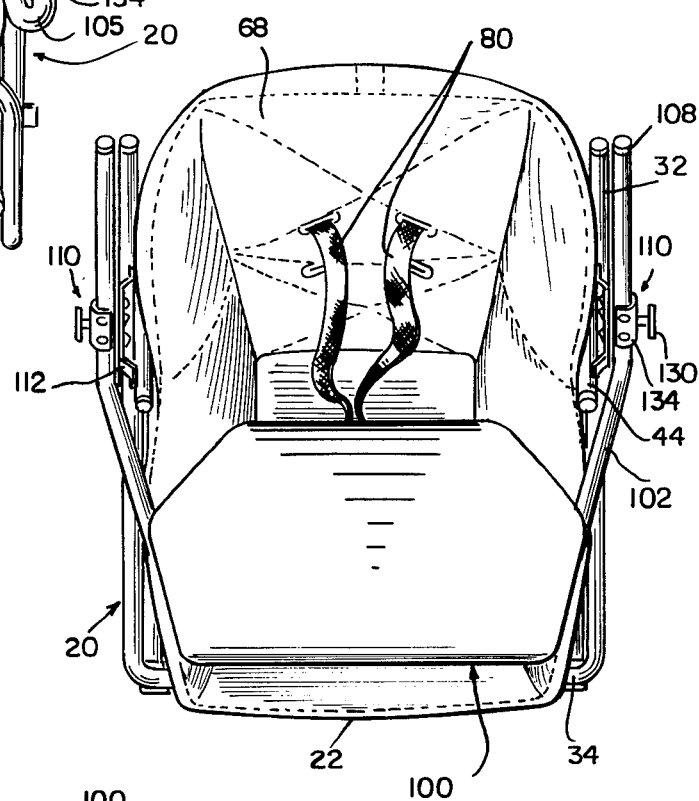
FIG. 2 is a top plan view of the juvenile car seat shown in FIG. 1.
Figure 3:
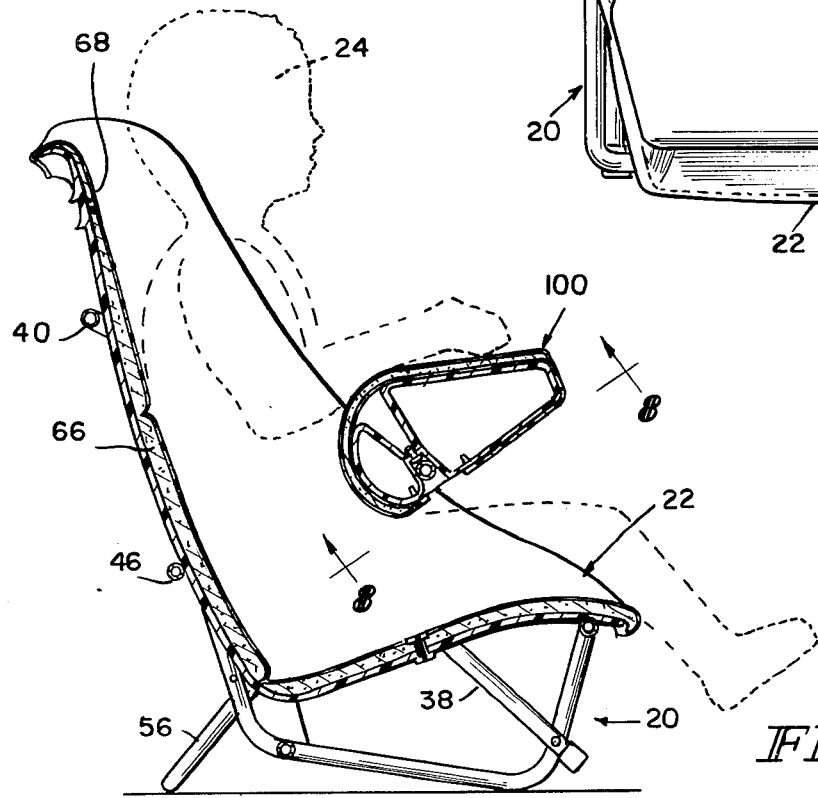
FIG. 3 is a transverse view of the seat shown in FIGS. 1 and 2 taken generally along sections lines 3—3 in FIG. 1 illustrating one operative position of the seat.
Figure 7:
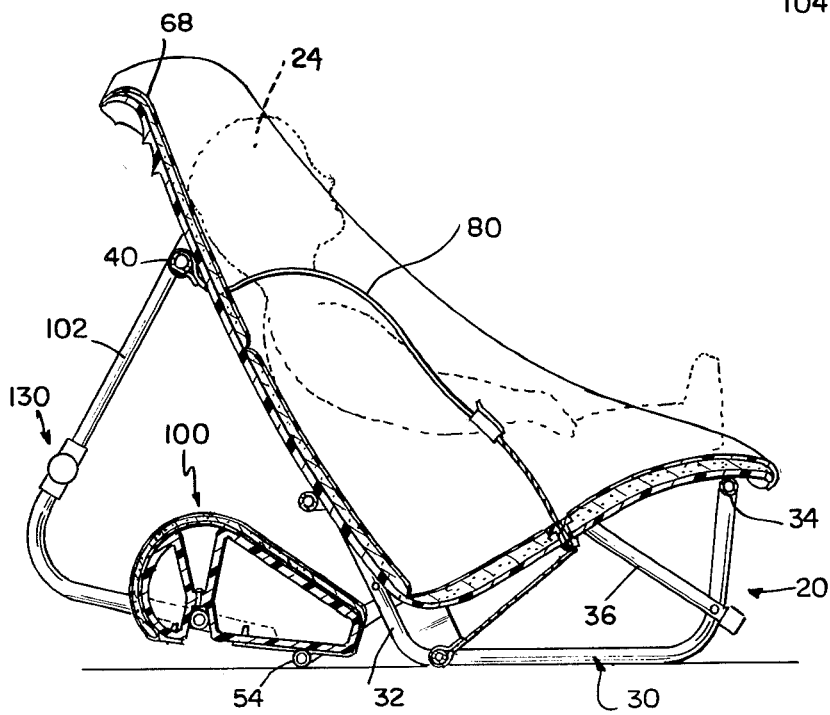
FIG. 7 is a transverse view similar to FIG. 3 of the seat of the present invention also taken generally along section lines 3—3 of FIG. 1 illustrating another operative position of the seat.

Although a seat constructed according to the present invention will not require the use of straps or belts when used in the operative position shown in FIG. 3, when the seat is used in the rear-facing position with barrier storage as shown in FIG. 7, straps or belts are desirable for securing the occupant 24 in the seat. Accordingly, as shown in FIGS. 1, 2 and 7, shoulder straps 80 and a crotch strap 82 may be provided through openings in the seat portion 22 of the seat for securing the occupant 24 in the seat.

The seat of the present invention includes a barrier 100 which is positionable in various locked positions in front of the seat portion 22 to limit or restrict forward movement of the occupant 24 placed in the seat portion 22. Further, the barrier 100 is positionable in a storage position at the rear of the seat portion 22 when the seat is utilized in the operative position shown in FIG. 7. The barrier 100 is secured to and swingably carried by an arm 102. The arm 102 is formed from a single chrome tube having side sections 104 with curved portions 105 and an intermediate section 106 between the side sections 104. The ends 108 of the side sections 104 are pivotally connected to the side sections 32 of frame member 30 so that the section 106 intermediate the side sections 104 is swingable over the top of the seat portion 22 between an operative position in front of the seat portion 22 and a barrier storage position at the rear of the seat portion 22. In a manner to be explained later, the barrier 100 is secured to and carried by the intermediate section 106 of the arm 102 so that it is hingedly movable on the frame structure 20 relative to the seat portion 22.

Figure 6:
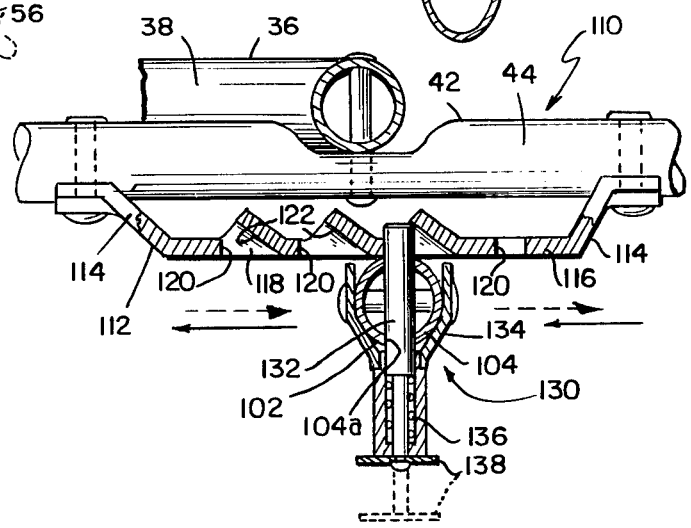
FIG. 6 is a transverse view, partly cross sectioned and broken away, of another section of the seat shown in FIGS. 1-4, taken generally along section lines 6—6 in FIG. 4.

Referring to FIGS. 4 and 6, the seat of the present invention further includes means 110 for automatically locking the barrier 100 in one of a plurality of selectable positions in various spaced relationships to the front of the seat portion 22 to prohibit movement of the barrier 100 in a first direction, away from the seat portion 22, as indicated by the solid arrows in FIGS. 4 and 6. The locking means 110 permits movement of the barrier 100 in a second direction toward the seat portion 22, as indicated by the broken arrows in FIGS. 4 and 6, to adjust the position of the barrier relative to the seat portion 22. The locking means 110 therefore unidirectionally prohibits movement of the barrier outwardly away from the seat portion 22 while permitting movement of the barrier inwardly toward the seat portion 22. This feature thus prevents a juvenile occupant of the seat from being dislodged in the event the vehicle is suddenly stopped and yet permits easy and automatic adjustment of the barrier for protection of the occupant.

The locking means 110 includes two detent straps 112 which are mounted to the side sections 44 of the frame member 42. The straps 112 each includes sides 114 with a web 116 therebetween in spaced relationship to the side sections 44 of the frame member 42. Formed in the webs 116 of the straps 112 are a series of detent notches 118. Each of the notches 118 includes a locking surface 120, and all but one of the notches 118 includes a camming surface 122. As shown best in FIG. 6, the notch 118 closest to the rear section 46 of the frame member 42 does not include a camming surface 120.

Means 130 for engaging the notches 118 in the detent straps 112 are mounted on the side sections 104 of arm 102 which carries the barrier 100. The engaging means 130 are mounted on the side sections 104 of the arm 102 intermediate the ends 108 which are pivotally connected to the side sections 32 of the frame member 30 and the barrier 100 which is supported and carried by the arm 102. More specifically, the engaging means 130 are mounted intermediate the ends 108 and the curved portions 105 of the side sections 104. The engaging means 130 are located a predetermined distance from the ends 108 so that when the arm 102 is swung over the top of the seat portion 22, each of the engaging means 130 scribe an arc of a circle which is generally tangent to the side sections 44 of the frame member 42 having a radius which is generally equal to the predetermined distance between the ends 108 and the engaging means 130. It can therefore be appreciated that the engaging means 130 are mounted on the arm 102 to correspond in location to the detent straps 112 when the side sections 104 of the arm 102 are in proximity to the side sections 44 of the frame member 42.

Referring more particularly to FIG. 6, each of the engaging means 130 includes a detent post or pin 132 which is housed within a sleeve 134 and carried within a hole 104a in side sections 104. The posts 132 are biased by springs 136 into engagement with the notches 118 of the straps 112. Connected to each detent post 132 is a grip or handle 138 for removing the posts 132 from the notches 118 to thereby release the arm 102 so that the barrier 100 is permitted to be moved away from the seat portion 22 in the direction of the solid arrows shown in FIGS. 4 and 6.

Figure 8:
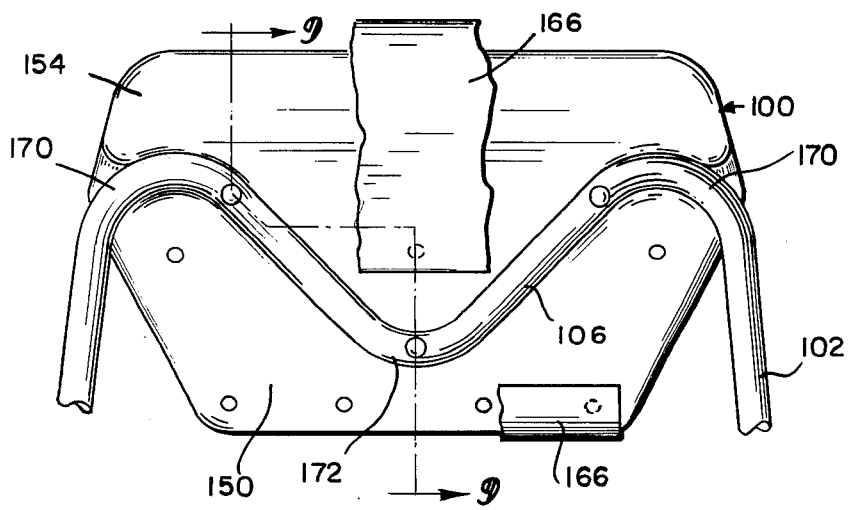
FIG. 8 is a bottom view, partly broken away, of a section of the seat shown in FIGS. 1–7 taken generally along section lines 8—8 in FIG. 3.
Figure 9:
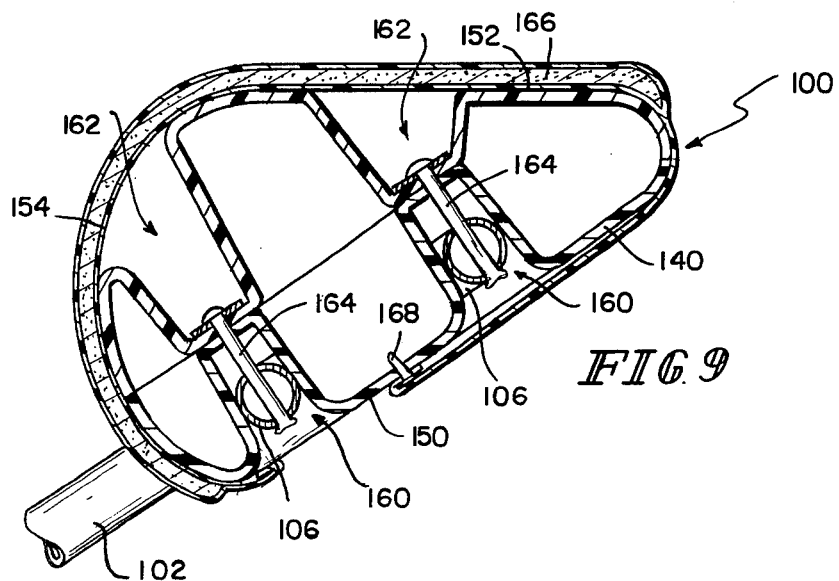
FIG. 9 is a transverse view of the section of the seat shown in FIG. 8 taken generally along section lines 9—9 in FIG. 8.

Referring now to FIGS. 8 and 9, the barrier 100 includes a molded shell 140 having a generally triangular shape when viewed in cross section, as best shown in FIG. 9, and more particularly the triangular shape approximates a right angle triangle. The shell 140 has a bottom surface 150 which corresponds generally to the hypotenuse of the right angle triangle, a top surface 152 which corresponds generally to the longer leg of the right angle triangle, and an arcuate end surface 154 which corresponds generally to the short leg of the right angle triangle. Section 154 is a child-protecting portion having a large radius of curvature, and top surface 152 may be flat to provide a table-like working surface. Formed in the bottom surface 150 of the shell 140 is a generally M-shaped groove 160. Cavities 162 are formed in the top and arcuate end surfaces 152, 154 of the shell 140 in locations corresponding to the groove 160. The intermediate section 106 of the arm 102 is likewise bent in a generally M-shape so that it corresponds exactly to the M-shaped groove 160 formed in the bottom surface 150 of the shell 140.

The intermediate section 106 therefore fits into the groove 160 in the bottom surface 150 of the shell 140, and the shell 140 is secured to the intermediate section 106 by means such as rivets 164 which are recessed in cavities 162 formed in the top and arcuate end surfaces 152, 154 of the shell 140.

The intermediate section 106 of the arm 102 includes two outer curved portions 170 bent in the same direction and a central curved portion 172 bent in a direction opposed to the curved portions 170 to form the generally M-shape. Each curved portion 170, 172 is an arc of a circle having a radius of 1.75 inches (4.445 cm). The two outer curved portions 170 subtend angles of approximately 122½°, and the central curved portion 172 subtends an angle of 90°. In the illustrative embodiment, the overall length of the intermediate section 106 is 16.75 inches (42.54 cm).

The non-linear shape of the intermediate section 106 of the arm 102 in cooperation with the groove 160 serves to prevent rotation of the shell 140 about the arm 102 and further adds strength and stability to the barrier 100 structure. The shell 140 may be molded from a polyethylene or other plastic-related material. In the illustrative embodiment, the barrier 100 includes a padded covering 166 which is secured to the bottom surface 150 of the shell 140 by fasteners 168. The fasteners 168 may removably engage the bottom surface 150 so that the cover 166 is easily removable for cleaning or interchangeability with other coverings.

Having described one embodiment of the seat of the present invention, its operation can best be described by referring to its two normal positions, as particularly shown in FIGS. 3 and 7. Referring to FIG. 3, the seat is shown in an operative position as it would be used in a vehicle where the occupant 24 faces toward the front of the vehicle. Although not shown, it will be understood that the seat will be anchored or secured to the vehicle seat by conventional safety belts provided in the vehicle. With the engaging means 130 removed or disengaged from the notches 118 in the straps 112, the barrier 100 is swung over the top of the seat portion 22 of the rear thereof to facilitate placement of the occupant 24 in the seat portion 22. Once the occupant 24 has been placed in the seat portion 22, the barrier 100 is swingable into position in a spaced relationship to the seat portion 22 in front of the occupant 24. As the detent post 132 engages the first notch 118 of the detent strap 112, the barrier 100 is automatically locked into a first spaced relationship relative to the seat portion 22 in front of the occupant 24. The locking of the barrier 100 in this first position occurs as a result of engagement of the post 132 with the locking surface 120 of the first notch 118 to prohibit movement of the barrier 100 away from the occupant 24 in the direction of the solid arrows shown in FIGS. 4 and 6.

In using the seat, it is desirable that the arcuate end surface 154 of the barrier 100 be positioned relatively close to the occupant 24 to limit or restrict forward movement of the occupant 24 should the vehicle suddenly stop. By applying a relatively light downward force to the barrier 100, the posts 132 are cammed out of each respective notch 118 in the series of notches 118 by the cam surfaces 122, until the barrier 100 is positioned in a selected spaced relationship to the seat portion 22 in proximity to the occupant 24 determined by the size of the occupant 24. The camming action of the posts 132 over the cam surfaces 122 produces a ratchet-type operation for the positioning of the barrier 100 in front of the seat portion 22.

The adjustable positioning of the barrier 100 relative to the occupant 24 and the seat portion 22 and the automatic locking of the barrier 100 in each position therefore allows the occupant 24 to be easily and quickly secured in the seat of the present invention without the need for straps or belts. The barrier may be positioned in relatively close proximity to occupants 24 of various sizes to limit or restrict their forward movement.

The barrier 100 is shaped so that its center of gravity is located in a relatively low position, and therefore the barrier 100 is gravity-biased toward the occupant 24 of the seat. Therefore, when relatively small forces are applied downward on the barrier 100, the barrier 100 will automatically ratchet inward toward the occupant 24 to provide a tighter fit. For example, in response to a sudden jolt of the vehicle or in response to the occupant 24 being thrust forward due to a sudden stop, the barrier 100 will have a tendency to move inward against the occupant 24 to further limit or restrict forward movement of the occupant 24.

In order to remove the occupant 24 from the seat, the grips 138 allow the post 132 to be removed from the detent notches 118 to release the barrier 100 so that it is swingable outward and upward over the top of the seat portion 22 to facilitate removal of the occupant 24 from the seat portion 22.

Referring particularly to FIG. 7, it may be desirable in some instances for the seat of the present invention to face toward the rear of the vehicle. For example, where the occupant 24 is a very young or small juvenile, it may be desirable that they face in a direction opposed to the direction that the other vehicle passengers face. In a second operative position for this purpose, the barrier 100 is swingable from the front of the seat portion 22 to the rear of the seat portion 22 and placed in a storage position. In the storage position, as shown in FIG. 7, the barrier 100 engages the intermediate section 58 of the tube 54 employed to incline the seat. Because of the existing inclination of most vehicle seats, it is desirable that the seat of the present invention be reclined to its maximum position when used in the operative position shown in FIG. 7. The barrier 100 can therefore be nested between the intermediate section 58 of the tube 54 and the back of the seat portion 22 for storage. When the barrier 100 is stored, it will be necessary to employ straps or belts to secure the occupant 24 in the seat. Accordingly, straps 80, 82 are provided through openings in the seat portion 22 for use in securing the occupant 24 in the operative position of the seat shown in FIG. 7. It should be noted, however, that when the seat is used in the operative position shown in FIG. 3, no straps are needed to secure the occupant 24 in the seat.

By adjusting the position of the barrier 100 relative to the occupant 24, the seat is adaptable to accommodate occupants 24 of various sizes without the need for adjusting belts or straps in the front facing position. As the position of the barrier 100 is adjusted, it is automatically locked into selected positions. These improvements allow the occupant to be easily and quickly secured in the seat of the present invention.

What is claimed is:

1. A juvenile car seat adapted to be held in place within a vehicle to restrain a juvenile occupant, comprising a seat for placement of a juvenile occupant, a barrier positionable in front of the seat for limiting forward movement of the occupant, coupling means for pivotally coupling the barrier to the seat to permit movement of the barrier relative to the seat, the coupling means including an arm for carrying the barrier and a pivotal connection for pivotally connecting the arm to the seat, and self-locking latch means to latch said arm to said seat, said self-locking latch means including a first portion on the arm and a second portion on the seat, the second portion of the latch means being provided on a circumference of a circle having a radius generally equal to the distance between the pivotal connection and the first portion, the first portion engaging the second portion when the barrier is moved toward the seat, said self-locking latch means, when engaged, prohibiting movement of the barrier in a direction away from the seat, thereby limiting forward movement of the occupant, and means for releasing the latch means so that the barrier can be moved relative to the seat.

2. The apparatus as recited in claim 1 wherein the latch means is positioned intermediate the pivotal connection and the barrier.

3. The apparatus as recited in claim 2 wherein the latch means includes a unidirectional detent means for automatically locking the first portion to the second portion when the barrier is moved toward the seat and for variably positioning the barrier in one of a plurality of spaced relationships relative to the front of the seat.

4. The apparatus as recited in claim 2 wherein the arm carrying the barrier includes a first section connected to the pivotal connection and a second section for carrying the barrier, the arm being hingedly movable to position the barrier in front of the seat.

5. The apparatus as recited in claim 4 wherein the second portion of the latch means includes a plurality of notches provided in fixed position on the seat and the first portion of the latch means is provided on the first section of the movable arm for engaging the notches.

6. The apparatus as recited in claim 5 wherein each notch includes a locking surface which, when engaged by the first portion, prohibits movement of the barrier in the direction away from the seat, and a camming surface which, when engaged by the first portion, permits movement of the barrier in a direction toward the seat.

7. The apparatus as recited in claim 6 wherein the first portion of the latch means includes at least one post and a spring for biasing the post into engagement with the notches for automatically locking the barrier in position, and the releasing means includes a grip for removing the post from the notches to unlock the barrier.

8. The apparatus as recited in claim 1 wherein the second section of the movable arm includes three curved portions for supporting the barrier to prevent rotation of the barrier relative to the arm.

9. The apparatus as recited in claim 8 wherein the second section of the movable arm is generally M-shaped and the barrier includes a generally M-shaped groove for receiving the second section of the arm.

10. The apparatus as recited in claim 9 wherein the barrier is generally triangular-shaped in cross section, the triangular shape being generally a right-angled triangle with the hypotenuse forming a bottom surface for securing the barrier to the second section of arm, the longer leg forming a planar top working surface, and the shorter leg forming a protective arcuate surface in proximity to the occupant.

11. A juvenile car seat adapted to be held in place within a vehicle to restrain a juvenile occupant, comprising a seat portion, a barrier positionable in front of the seat to limit forward movement of an occupant of the seat portion, coupling means for hingedly coupling the barrier to the seat portion to permit movement of the barrier in an arcuate path from a position away from the seat portion to a position in front of the seat portion, the coupling means including a pivotal connection and means for carrying the barrier, latch means for adjusting the position of the barrier relative to the seat portion and for automatically sustaining the barrier in a position in front of the seat portion, the latch means including a first portion on the barrier-carrying means and a second portion on the seat which engage when the barrier is moved in its arcuate path, the second portion of the latch means being provided on a circumference of a circle having a radius generally equal to the distance between the pivotal connection and the first portion, and means for releasing the latch means so that the barrier can be moved related to the seat.

12. The apparatus as recited in claim 11 wherein the latch means is positioned intermediate the the pivotal connection and the barrier.

13. In a juvenile car seat the type including a seat portion adapted to be held in place within a vehicle, a barrier positionable in front of the seat to limit forward movement of an occupant of the seat portion, an arm carrying the barrier, and pivot means for pivotally connecting the arm to the seat portion, the improvement comprising latch means for adjustably positioning the barrier in one of a plurality of spaced relationships to the seat portion and for automatically locking the barrier in a position in front of the seat portion, the latch means including a first portion on the arm and a second portion on the seat portion which engage when the barrier is moved toward the seat portion, the second portion of the latch means being provided on a circumference of a circle having a radius generally equal to the distance between the pivot means and the first portion, the latch means, when engaged, prohibiting movement of the barrier in a direction away from the seat portion, and means for releasing the first and second portions of the latch means so that the barrier can be moved relative to the seat.

14. A child's seat for use vehicle comprising
a seat, including a supporting structure, adapted to be held in place within a vehicle; and
a child-restraining means, including a barrier fastened to the supporting structure of the seat by hinge means and an arm carrying a pair of fasteners that are adapted to engage a pair of cooperating fastening means carried on each side of the seat, the pair of cooperating fastening means being provided on a circumference of a circle having a radius generally equal to the distance between the hinge means and the pair of fasteners on the arm,
said barrier being swingable on said hinge means between a barrier storage position and an operative position where the barrier is immediately in front of the seat and where said pair of fasteners engage the cooperating fastening means carried by the seat to thereby prevent an occupant of the seat from being urged forwardly from the seat if the vehicle is stopped quickly, and means for releasing the fasteners from the fastening means so that the barrier can be moved relative to the seat.

15. The child's seat of claim 14 wherein the barrier included a single tubular U-shaped member with its open end formed by two upwardly extending arms, wherein the closed end of the tubular, U-shaped member has a non-linear portion and carries a cushioning means so that it will not rotate, wherein said hinge means is located adjacent the ends of, and said fasteners are carried by each of, the two upwardly extending arms, wherein the seat includes two sections extending within the barrier when the barrier is in its operative position, and wherein said two seat sections carry the cooperating fastening means on the circumference of the circular movement of the fasteners about the hinge means as the barrier is moved in the operative position, said cooperating fastening means being provided with a plurality of surfaces to be engaged by the pair of fasteners on the barrier to provide adjustment of the position of the cushioning means in the operative position.

16. The child's seat of claim 15 wherein the non-linear closed end of the tubular U-shaped member is generally M-shaped and wherein the cushioning member comprises a molded central core with a generally M-shaped groove to receive the M-shaped portion of the U-shaped barrier member, said cushioning means including a child-protecting portion having a large radius of armature and a table-like top surface when in the operative position.

17. The child's seat of claim 13 wherein the pair of fasteners each comprises a post carried by and retained in a hole in an upwardly extending arm of the tubular member, said pin projecting and being spring biased to be urged inwardly in the direction of the child's seat, and said fastening means includes a pair of straps with a plurality of detent notches into which the rod extends to maintain the cushioning means in one of a plurality of positions.

18. A juvenile car seat adapted to be held in place within a vehicle to restrain a juvenile occupant, comprising a seat for placement of a juvenile occupant, a barrier positionable in front of the seat for limiting forward movement of the occupant, an arm carrying the barrier, a pivot means for pivotally connecting the arm to the seat, a self-locking latch means for latching the barrier to the seat, the latch means including detent means for prohibiting movement of the barrier in a direction away from the seat, the detent means including a first portion on the arm and a second portion on the seat, the second portion of the detent means being provided on a circumference of a circle having a radius generally equal to the distance between the pivot means and the first portion of the detent means, and means for releasing the detent means so that the barrier can be moved relative to the seat.

19. A juvenile car seat adapted to be held in place within a vehicle to restrain a juvenile occupant, comprising a seat for placement of a juvenile occupant, a barrier positionable in front of the seat for limiting forward movement of the occupant, an arm carrying the barrier, pivot means for pivotally connecting the arm to the seat to permit movement of the barrier relative to the seat, the arm including a generally M-shaped section for supporting the barrier, the barrier including a generally M-shaped groove for receiving the M-shaped section of the arm, and self-locking latch means including a first portion on the arm intermediate the pivot means and the barrier and a second portion on the seat to latch the barrier to the seat, the self-locking latch means, when engaged, prohibiting movement of the barrier in a direction away from the seat, thereby limiting forward movement the occupant.

* * * * *

UNITED STATES PATENT AND TRADEMARK OFFICE
CERTIFICATE OF CORRECTION

PATENT NO. : 4,456,302
DATED : June 26, 1984
INVENTOR(S) : Roy E. Knoedler et al It is certified that error appears in the above-identified patent and that said Letters Patent is hereby corrected as shown below:

Column 6, line 29, change "of" to --to--.

Column 8, line 37 (claim 8), change "1" to --4--.

Column 9, line 7 (claim 12), before "pivotal", delete "the".

Column 9, line 30 (claim 14), after "use", insert --in a--.

Column 10, line 18 (claim 17), change "13" to --15--.

Column 10, line 60 (claim 19), after "movement", insert --of--.

Signed and Sealed this

Fifth Day of March 1985

[SEAL]

Attest:

DONALD J. QUIGG

Attesting Officer     Acting Commissioner of Patents and Trademarks